United States Patent [19]

Ogata

[11] Patent Number: 5,490,128
[45] Date of Patent: Feb. 6, 1996

[54] OPTICAL HEAD HAVING A LIGHT SOURCE ADJUSTING MECHANISM AND A METHOD FOR ADJUSTING A LIGHT SOURCE IN AN OPTICAL HEAD

[75] Inventor: Daisuke Ogata, Amagasaki, Japan

[73] Assignee: Matsushita Electric Industrial Co., Ltd., Osaka, Japan

[21] Appl. No.: 331,723

[22] Filed: Oct. 31, 1994

[30] Foreign Application Priority Data

Nov. 5, 1993 [JP] Japan .................................. 5-276402

[51] Int. Cl.⁶ .................................................. G11B 7/00
[52] U.S. Cl. .................... 369/116; 369/121; 369/122; 359/800; 359/822; 362/259; 362/268
[58] Field of Search .................... 369/116, 113, 369/121, 122, 99; 359/800, 822; 362/84, 232, 259, 268, 269, 270

[56] References Cited

U.S. PATENT DOCUMENTS

| 4,088,396 | 5/1978 | Edelstein | 359/822 |
|---|---|---|---|
| 4,498,737 | 2/1985 | Doggett | 359/800 |
| 5,008,873 | 4/1991 | Tanaka et al. | 359/822 |
| 5,033,040 | 7/1991 | Fujita | 369/44.37 |
| 5,144,616 | 9/1992 | Yasukawa et al. | 369/122 |

FOREIGN PATENT DOCUMENTS

| 340230 | 2/1991 | Japan . |
|---|---|---|
| 4146533 | 5/1992 | Japan . |

Primary Examiner—Loha Ben
Attorney, Agent, or Firm—Renner, Otto, Boisselle & Sklar

[57] ABSTRACT

An optical head of this invention includes: a light source emitting a plurality of beams from a plurality of emitting points; an optical system for focusing the plurality of beams on a recording medium; and an adjusting means for adjusting distances from the plurality of emitting points to the optical system, wherein the adjusting means includes a first member for supporting the light source and a second member for supporting the first member; the first member is rotatable around a central axis which is vertical to the plane including an optical axis of the optical system and the plurality of emitting points and passes through a point on the optical axis; and the second member is movable along a reference plane vertical to the optical axis.

7 Claims, 2 Drawing Sheets

OPTICAL HEAD HAVING A LIGHT SOURCE ADJUSTING MECHANISM AND A METHOD FOR ADJUSTING A LIGHT SOURCE IN AN OPTICAL HEAD

BACKGROUND OF THE INVENTION

1. Field of the Invention

The present invention relates to a multi-beam optical head for obtaining reproduced information signals and various kinds of servo signals by utilizing light reflected by a recording medium, and, in particular, to a multi-beam optical head having a mechanism for adjusting the position of a light source relative to that of a head optical system and a method for adjusting the position of the light source relative to that of the head optical system.

2. Description of the Related Art

A multi-beam optical head is an optical head which leads a plurality of beams emitted from a monolithic light source having a plurality of emitting points, e.g. a semiconductor laser, to an identical optical system and converges the beams on a recording surface of a recording medium, e.g. an optical disc, so as to record and reproduce the information of the respective beams. When such a multi-beam optical head is used, a focus error signal is detected by using any one of the plurality of beams passing through an identical objective lens to conduct a focus servo so that the selected beam may be converged on the recording medium more precisely than any other beam. In conducting the focus servo, in order to situate the focal points of all the beams on the recording medium, i.e. on the same plane, the deviation of the focal point of the beam to be subjected to the focus servo from those of the other beams should be sufficiently smaller than the focal depth of the beam.

The distance from an optical system to the focal point of a beam depends on the distance from the emitting point of a light source to the optical system. Since the positions of the emitting points of a multi-beam light source deviate from each other because of the errors occurring in the production process, the distances from the emitting points to the optical system are different in their respective beams. Accordingly, the distances from the optical system to the focal points of the respective beams are also different. The amount of the deviation is determined depending on the amount of the error of the position of the emitting point and the image magnification of the optical system. For example, if the deviation of given two emitting points is assumed to be 4 μm and the image magnification of an optical system is ¼ as actual values, the deviation of the positions of the focal points is approximately 1 μm. This error of the relative positions of the focal points is significantly large compared with the standard focal depth of about 1 to 2 μm of a currently available optical head.

As a conventional technique for solving the above-mentioned problem, there is proposed a technique disclosed in Japanese Laid-Open Patent Publication No. 3-40230. The multi-beam optical head according to this technique includes a signal detecting optical system for detecting focus error signals based on a first beam for an ordinary focus servo and an additional second beam; and a driving means for controlling the light source by rotating it so as to eliminate the deviation of the focal point of the second beam based on the detected focus error signal. And the optical head conducts the correction of the focal point of the second beam in addition to the focus servo of the first beam in order to restrict the deviation of the focal points of all the beams to the acceptable range.

When such a technique is employed, however, the configuration of the head becomes disadvantageously complicated because an additional optical system for detecting signals or an additional driving mechanism is required as well as an ordinary focus servo mechanism. The major cause of the deviation of the focal points is the deviation of the positions of the emitting points caused by the errors of the position of the light source occurring during the production process. However, the positions of the emitting points never deviate during the operations of the optical head. Accordingly, it is not necessarily indispensable to conduct such corrections of the focal points at a real time during the operations of the optical head and it is not preferable to make the configuration complicated just for this purpose. Furthermore, in the controls to correct the focal point, a signal control as well as the ordinary focus control must be conducted, so it is difficult to design a servo system in which the entire system may operate smoothly.

SUMMARY OF THE INVENTION

The optical head according to the present invention includes:

a light source emitting a plurality of beams from a plurality of emitting points;

an optical system for focusing the plurality of beams on a recording medium; and an adjusting means for adjusting the distances from the plurality of emitting points to the optical system, wherein the adjusting means includes a first member for supporting the light source and a second member for supporting the first member; the first member is rotatable around a central axis which is vertical to a plane including the optical axis of the optical system and the plurality of emitting points and passes through a point on the optical axis; and the second member is movable along a reference plane vertical to the optical axis.

In one embodiment, the second member includes a surface vertical to the optical axis and a cylindrical surface having the central axis, and the first member has a surface sliding along the cylindrical surface of the second member.

In another embodiment, the central axis is distant to an intersecting point between the optical axis and a line connecting the plurality of emitting points.

In still another embodiment, the central axis passes through the intersecting point between the optical axis and the line connecting the plurality of emitting points.

In still another embodiment, the first member has a cylindrical surface having the central axis, and the second member has a surface vertical to the optical axis and a surface sliding along the cylindrical surface of the first member.

According to the present invention, a method is provided for adjusting distances from a plurality of emitting points to an optical system of an optical head. The optical head of this invention includes a light source emitting a plurality of beams from the plurality of emitting points; the optical system for focusing the plurality of beams on a recording medium; a first member which supports the light source and is rotatable around a central axis which is vertical to a plane including an optical axis of the optical system and the plurality of emitting points, and passes through a point on the optical axis; and a second member which supports the first member and is movable along a reference plane vertical to the optical axis.

And the method includes the steps of:

a) moving the second member along the reference plane so that positions of the plurality of emitting points are within an acceptable range of the aberration of the optical system, b) fixing the position of the second member relative to the optical system, after the step a), c) rotating the first member around the central axis so that respective focal points of the plurality of beams are situated substantially on the same plane, after the step b), and d) fixing the position of the first member relative to the second member, after the step c).

In one embodiment, the method further includes the steps of:

e) releasing the position of the second member relative to the optical system, after the step d), f) moving the second member along the reference plane so that the positions of the plurality of emitting points are within the acceptable range of the aberration of the optical system, after the step e), and, g) fixing the position of the second member relative to the optical system, after the step f).

The objective of the present invention is to solve the above-mentioned conventional problems and provide an optical head in which the deviation of the focal points of a plurality of beams can be eliminated without using any additional optical system for detecting signals or an additional driving mechanism, and a method for adjusting the distance from an optical system to a plurality of emitting points in the optical head so that the deviation of the focal points of the plurality of beams can be eliminated.

If a light source is rotated around an axis vertical to both the optical axis of a fixed optical system and the arrangement direction of a plurality of emitting points, the distance from the optical system to each of the plurality of emitting points varies in accordance with the amount of the rotation. The deviation of a plurality of the positions of focal points can be adjusted so as to be sufficiently small by using such variation. The deviation of the positions of the emitting points is a static one mainly because of the errors of a light source occurring during the production process. Thus, if the light source is fixed in the body of an optical head after the adjustment, the plurality of focal points will always be situated on the same plane following the fixation.

Thus, the invention described herein makes possible the advantages of (1) eliminating the deviation of the focal points of the plurality of beams under a much simplified configuration without adding an extra optical system for detecting signals or an extra driving mechanism, because the positions of the emitting points of the light source relative to the direction of the optical axis can be adjusted and (2) avoiding the use of the complicated design of the servo system which requires an additional driving mechanism, because the focus servo mechanism of this invention may be all the same as that of an ordinary single-beam optical head.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying drawings.

Example 1

Figure 1:
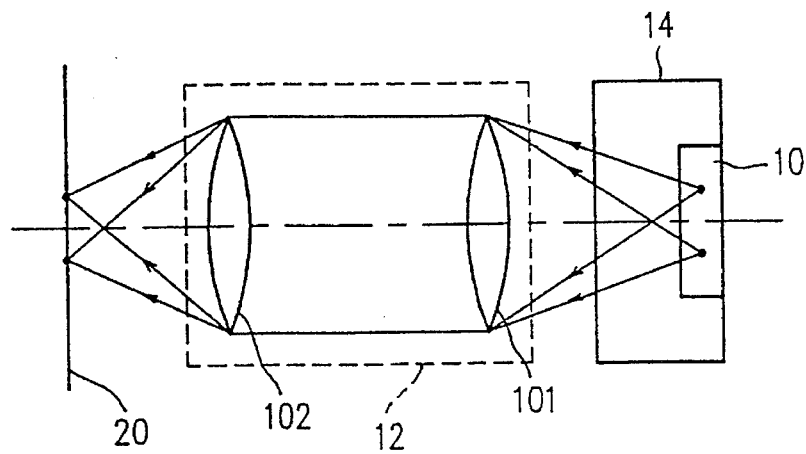
FIG. 1 is a view showing an arrangement of a multi-beam optical head according to the present invention.

FIG. 1 shows an arrangement of an optical head according to the present invention. The optical head includes a light source 10 emitting a plurality of beams from a plurality of emitting points, an optical system 12 for focusing the plurality of beams on a recording medium 20, and an adjusting portion 14 for adjusting the distances from the plurality of emitting points to the optical system 12. The optical system 12 includes a collimate lens 101 for making the plurality of beams emitted from the plurality of emitting points parallel to each other, and an objective lens 102 for converging the parallel beams onto the recording medium 20.

Figure 2:
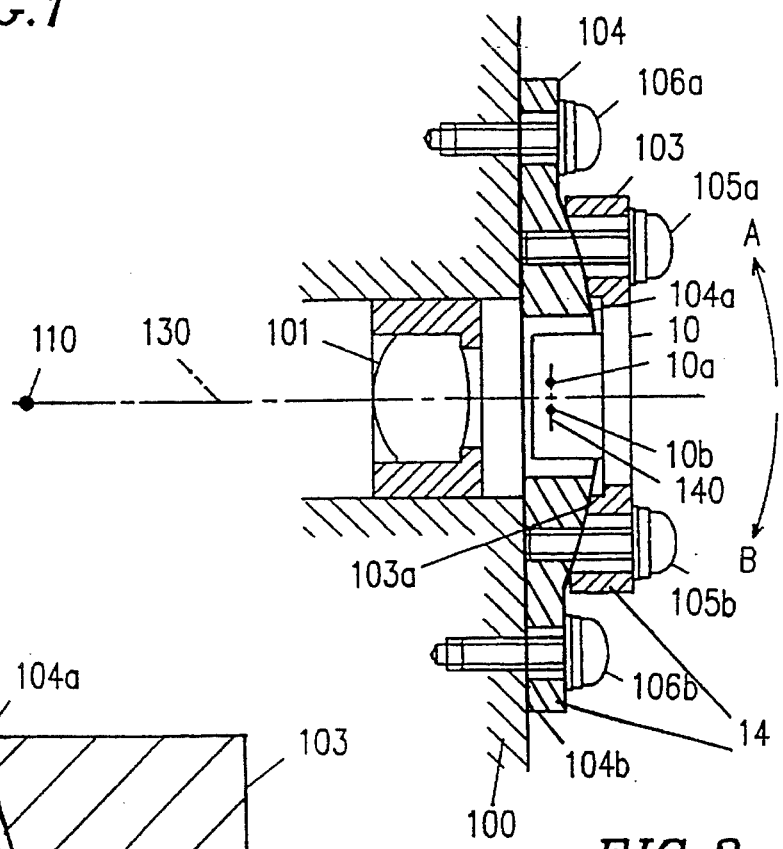
FIG. 2 is a view showing the construction of a light source portion of the multi-beam optical head of the first example according to the present invention.

FIG. 2 shows a construction of a light source portion of the optical head of the first example according to the present invention. The light source portion shown in FIG. 2 includes a light source 10, a collimate lens 101, and an adjusting portion 14. In the following description, for simplification, it is assumed that the light source 10 is a two-beam semiconductor laser emitting two beams from the emitting points 10a and 10b. The present invention, however, is not limited to the number of the beams emitted from the light source 10.

The adjusting portion 14 includes a first member 103 and a second member 104. The two-beam semiconductor laser 10 is embedded in the first member 103, and the first member 103 is coupled to the second member 104 by tightening up the screws 105a and 105b. The second member 104 is coupled to the body 100 of the optical head by tightening up the screws 106a and 106b. The second member 104 has a cylindrical surface 104a having a central axis 110 and a surface 104b vertical to an optical axis 130. The axis 110 is vertical to both of the optical axis 130 of the optical system 12 and a line 140 connecting the emitting points 10a and 10b, and the axis 110 is distant to the intersecting point of the optical axis 130 and the line 140. The first member 103 has a surface 103a sliding along the cylindrical surface 104a of the second member 104.

Hereinafter, how the distance from the emitting points 10a and 10b to the collimate lens 101 can be adjusted by using the first and the second members 103 and 104 will be described.

First, the second member 104 is moved along the surface 104b so that the positions of the emitting points 10a and 10b in a direction vertical to the optical axis 130 are within the acceptable range of the aberration of the optical system 12. Then the position of the second member 104 is fixed relative to the body 100 of the optical head by tightening the screws 106a and 106b.

Next, the first member 103 is rotated in the direction A or B as shown in FIG. 2 along the cylindrical surface 104a of the second member 104. The movement of the first member 103 causes the tilted angle of the arrangement of the emitting points 10a and 10b to be changed. As a result, the positions of the emitting points 10a and 10b relative to the collimate lens 101 are changed in the direction of the optical axis 130, thus the deviation of the respective focal points of the beams can be reduced. For example, if the first member 103 is rotated in the direction A, the emitting point 10a comes closer to the collimate lens 101 than the emitting point 10b, and if the first member 103 is rotated in the direction B, the opposite result is obtained. The first member 103 is rotated along the cylindrical surface 104a of the second member 104 so that the deviation of the emitting points 10a and 10b in the direction of the optical axis 130 may be a predetermined value or less, and then the screws 105a and 105b are tightened up, so as to fix the position of the first member 103 relative to the second member 104.

Then the screws 106a and 106b are released. Subsequently, the second member 104 is moved along the surface 104b in the opposite direction to the movement direction of the first member 103 and by the same amount of movement as that of the first member 103 vertical to the optical axis 130. This movement is conducted because the rotation of the first member 103 along the cylindrical surface 104a of the second member 104 causes the positions of the emitting points 10a and 10b in the direction vertical to the optical axis 130 to change. Accordingly, the second member 104 is moved again along the surface 104b so that the positions of the emitting points 10a and 10b in the direction vertical to the optical axis 130 are within the acceptable range of the aberration of the optical system 12. Finally, the screws 106a and 106b are tightened, so as to fix the position of the second member 104 relative to the body 100 of the optical head.

Figure 3:
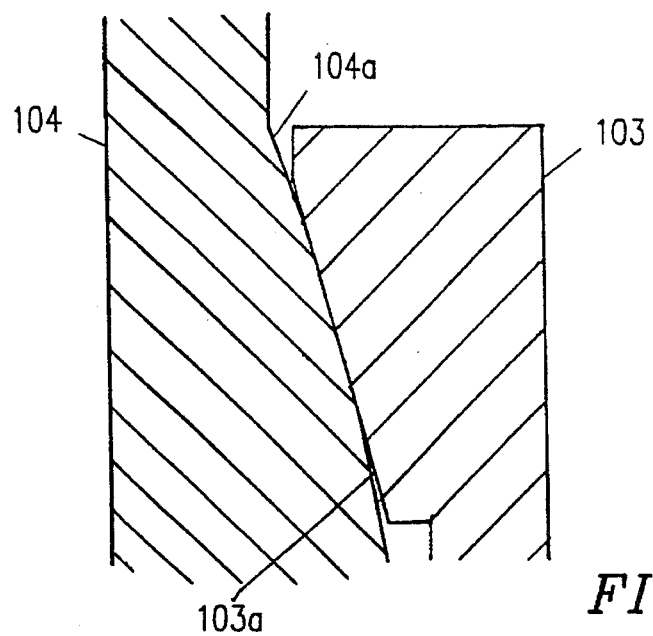
FIG. 3 is an enlarged view of the light source portion of the multi-beam optical head of the first example according to the present invention.

FIG. 3 is an enlarged view of the contact portion between the surface 103a of the first member 103 and the cylindrical surface 104a of the second member 104. In this example, the surface 103a of the first member 103 is plane. Alternatively, the surface 103a of the first member 103 may be a cylindrical one having a radius equal to or more than that of the cylindrical surface 104a of the second member 104.

Figure 4:
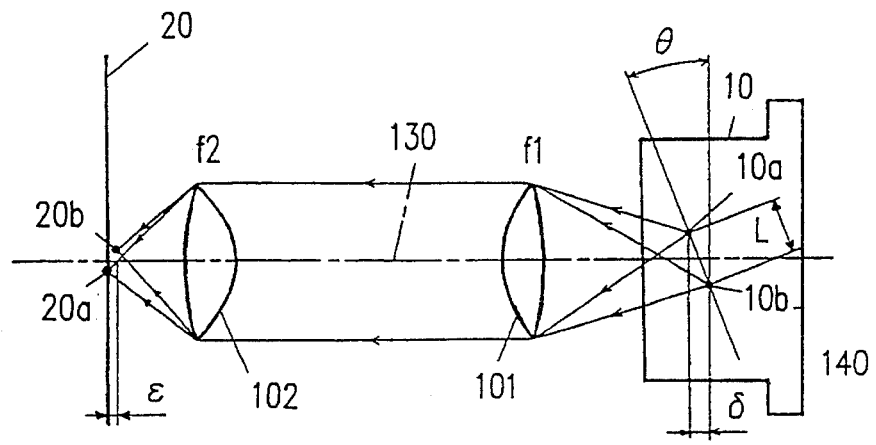
FIG. 4 is a view for explaining the principle of the adjustment of the distance from an optical system to a plurality of emitting points.

Hereinafter, referring to FIG. 4, the principle for adjusting the positions of the focal points of the respective beams will be described in accordance the above-mentioned method. The semiconductor laser 10 emits beams from the respective emitting points 10a and 10b. The emitting point 10a is separated from the emitting point 10b by the space L. The beams respectively emitted from the emitting points 10a and 10b are made into parallel beams by the collimate lens 101 having a focal length f1. Then, the parallel beams are incident on the objective lens 102 having a focal length f2 and converged by the lens 102. As a result, the light spots 20a and 20b are formed on the recording medium 20. The emitting points 10a and 10b are generally tilted to the axis of their package 10 because of errors occurring during the production process. If the tilted angle is denoted by $\theta$, the positions of the emitting points 10a and 10b in the direction of the optical axis 130 deviate from each other by $\delta$, i.e. $L\sin\theta$, because of the space L. At this time, the deviation $\epsilon$ of the positions of the light spots 20a and 20b in the direction of the optical axis 130 is determined by the image magnification of the optical system 12 and is expressed by: $\epsilon=(f2/f1)^2\delta$. If L is 100 μm and $\theta$ is 2 degrees as typical values of a multi-beam semiconductor laser 10, and if f1 is 8 mm and f2 is 4 mm as typical values of an optical system 12, then the deviation $\epsilon$ is 0.9 μm. When the mechanism shown in FIG. 2 for adjusting the relative distances from the collimate lens 101 to the emitting points 10a and 10b is used to move the semiconductor laser 10 to the direction A or B by an appropriate amount, the arrangement angle $\theta$ of the emitting points 10a and 10b is changed. As a result, the errors $\delta$ between the emitting points 10a and 10b in the direction of the optical axis 130 can be reduced, thus the deviation $\epsilon$ between the light spots 20a and 20b in the direction of the optical axis 130 can be reduced to an acceptable value or less. For example, if the arrangement angle $\theta$ of the emitting points 10a and 10b is adjusted to be 0.1 degree, the error of the relative positions of the light spots 20a and 20b on the recording medium 20 is a negligible value of 0.04 μm. This adjustment corresponds to the positioning of the light source 10 by the precision of 50 μm when the radius of curvature of the cylindrical surface 104a is 30 mm. Such an adjustment can be realized by a relatively easy method, e.g. by hand or by the use of a micro meter.

Example 2

Figure 5:
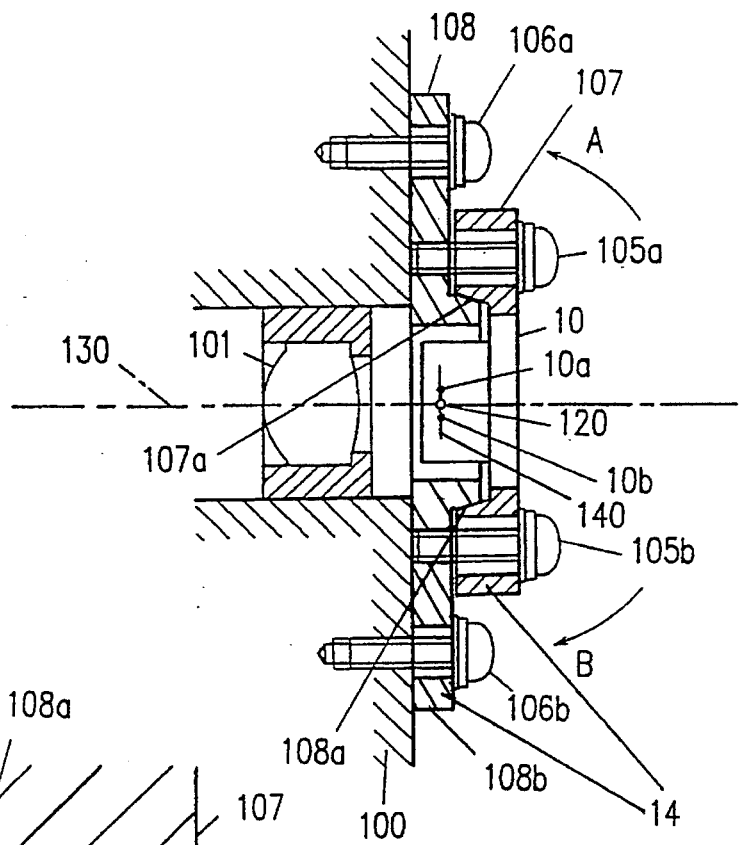
FIG. 5 is a view showing the construction of a light source portion of the multi-beam optical head of the second example according to the present invention.

FIG. 5 shows a construction of a light source portion of the optical head of the second example according to the present invention. The light source portion shown in FIG. 5 includes a light source 10, a collimate lens 101 and an adjusting portion 14. In the following description, for simplification, it is assumed that the light source 10 is a two-beam semiconductor laser emitting two beams from respective emitting points 10a and 10b. The present invention, however, is not limited to the number of the beams emitted from the light source 10.

The adjusting portion 14 includes a first member 107 and a second member 108. The two-beam semiconductor laser 10 is embedded in the first member 107 and the first member 107 is coupled to the second member 108 by tightening up the screws 105a and 105b. The second member 108 is coupled to the body 100 of the optical head by tightening the screws 106a and 106b. The second member 108 has a cylindrical surface 108a having a central axis 120 and a surface 108b vertical to an optical axis 130. The axis 120 is vertical to both the optical axis 130 of the optical system 12 and the line 140 connecting the emitting points 10a and 10b and passes through the intersecting point between the optical axis 130 and the line 140. The first member 107 has a surface 107a sliding along the cylindrical surface 108a of the second member 108.

Hereinafter, how the distance from the collimate lens 101 to the emitting points 10a and 10b can be adjusted by using the first and the second members 107 and 108 will be described.

First, the second member 108 is moved along the surface 108b so that the positions of the emitting points 10a and 10b in the direction vertical to the optical axis 130 may be within the acceptable range of the aberration of the optical system 12. Then, the position of the second member 108 relative to the body 100 of the optical head is fixed by tightening the screws 106a and 106b.

Next, the first member 107 is rotated in a direction A or B as shown in FIG. 5 along the cylindrical surface 108a of the second member 108. The movement of the first member 107 causes the tilted angle of the arrangement of the emitting points 10a and 10b to change. As a result, the positions of the emitting points 10a and 10b relative to the collimate lens 101 are changed in the direction of the optical axis 130, thus the deviation of the respective focal points of the beams can be reduced. For example, if the first member 107 is rotated in the direction A, the emitting point 10a comes closer to the collimate lens 101 than the emitting point 10b, and if the first member 107 is rotated in the direction B, the opposite result is obtained. The first member 107 is rotated along the cylindrical surface 108a of the second member 108 so that the deviation of the emitting points 10a and 10b in the direction of the optical axis 130 may be a predetermined value or less, and then the screws 105a and 105b are tightened, so as to fix the position of the first member 107 relative to the second member 108.

As described above, in this example, the central axis 120 of the cylindrical surface 107a passes through the intersecting point between the optical axis 130 and the line 140. Because of this arrangement, the movement of the first member 107 along the cylindrical surface 108a of the second member 108 is equivalent to the rotation of the semiconductor laser 10 around the central axis 120 of the cylindrical surface 108a. Accordingly, if the first member 107 is moved along the cylindrical surface 108a of the second member 108, the positions of the emitting points 10a and 10b in the direction vertical to the optical axis 130 are hardly changed. Consequently, it is not necessary to re-adjust the position of the second member 108 relative to the body 100 of the optical head after the position of the first member 107 relative to the second member 108 is already adjusted.

Figure 6:
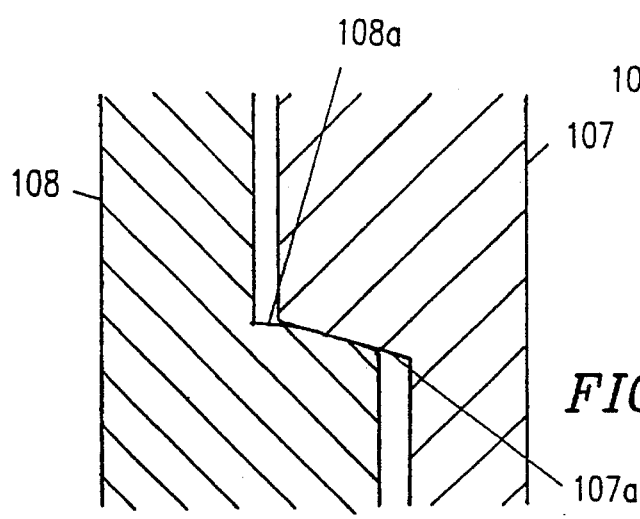
FIG. 6 is an enlarged view of the light source portion of the multi-beam optical head of the second example according to the present invention.

FIG. 6 is an enlarged view of the contact portion between the surface 107a of the first member 107 and the cylindrical surface 108a of the second member 108. In this example, the surface 107a of the first member 107 is plane. Alternatively, the surface 107a of the first member 107 may be a cylindrical one having a radius equal to or more than that of the cylindrical surface 108a of the second member 108.

The present invention has been described relative to the case where this invention is applied to an optical head having a light source emitting two beams. This invention, however, is not limited thereto, but can be applied to an optical head having a light source emitting three beams or more. And, in the above description, the second member has a cylindrical surface and the first member has a surface sliding along the cylindrical surface. Alternatively, the present invention can be applied to the case where the first member has a cylindrical surface and the second member has a surface sliding along the cylindrical surface. Also in such a case, the same effects as those described above can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical head comprising:

a light source emitting a plurality of beams from a plurality of emitting points;

an optical system for focusing the plurality of beams on a recording medium; and an adjusting means for adjusting distances from the plurality of emitting points to the optical system, wherein the adjusting means comprises a first member for supporting the light source and a second member for supporting the first member; the first member is rotatable around a central axis which is vertical to a plane including an optical axis of the optical system and the plurality of emitting points and passes through a point on the optical axis; and the second member is movable along a reference plane vertical to the optical axis.

2. An optical head according to claim 1, wherein the second member comprises a surface vertical to the optical axis and a cylindrical surface having the central axis, and the first member has a surface sliding along the cylindrical surface of the second member.

3. An optical head according to claim 2, wherein the central axis is distant to an intersecting point between the optical axis and a line connecting the plurality of emitting points.

4. An optical head according to claim 2, wherein the central axis passes through the intersecting point between the optical axis and the line connecting the plurality of emitting points.

5. An optical head according to claim 1, wherein the first member has a cylindrical surface having the central axis, and the second member has a surface vertical to the optical axis and a surface sliding along the cylindrical surface of the first member.

6. A method for adjusting distances from a plurality of emitting points to an optical system of an optical head comprising a light source emitting a plurality of beams from the plurality of emitting points; the optical system for focusing the plurality of beams on a recording medium; a first member which supports the light source and is rotatable around a central axis which is vertical to a plane including an optical axis of the optical system and the plurality of emitting points, and passes through a point on the optical axis; and a second member which supports the first member and is movable along a reference plane vertical to the optical axis, the method comprising the steps of:

a) moving the second member along the reference plane so that positions of the plurality of emitting points are within an acceptable range of an aberration of the optical system;

b) fixing the position of the second member relative to the optical system, after step a);

c) rotating the first member around the central axis so that respective focal points of the plurality of beams are situated substantially on the same plane, after step b); and d) fixing the position of the first member relative to the second member, after step c).

7. A method according to claim 6 further comprising the steps of:

e) releasing the position of the second member relative to the optical system, after step d);

f) moving the second member along the reference plane so that the positions of the plurality of emitting points are within the acceptable range of the aberration of the optical system, after step e); and, g) fixing the position of the second member relative to the optical system, after step f).

* * * * *